Patented Feb. 20, 1951

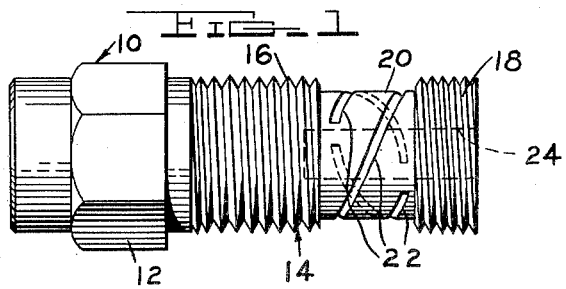
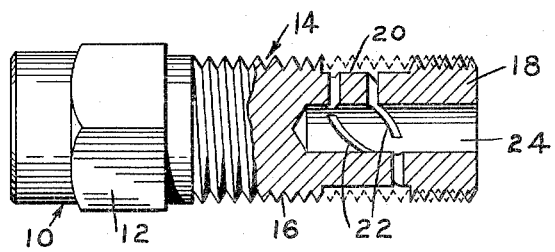
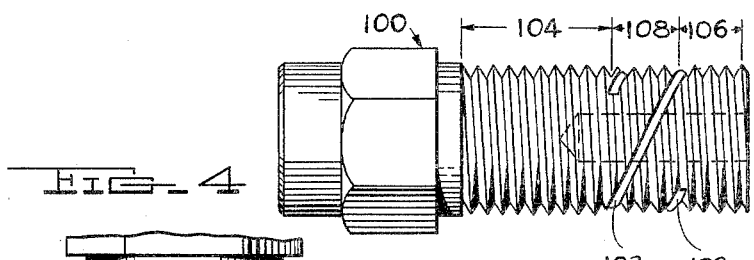
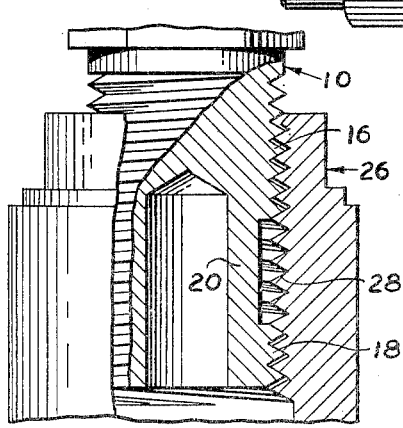

2,542,377

UNITED STATES PATENT OFFICE 2,542,377

SELF-LOCKING SCREW

Michael C. Turkish, Detroit, Mich., assignor to Eaton Manufacturing Company, Cleveland, Ohio, a corporation of Ohio Application December 21, 1946, Serial No. 717,697

2 Claims. (Cl. 151—22)

1

This invention relates to locking connections and more particularly to self-locking adjustment screws.

Broadly the invention comprehends the provision of self-locking adjustment screws or studs each having a pair of axially spaced threaded sections of equal pitch diameter, the lead of the thread of one section being offset axially with respect to the lead of the thread of the other section and having resilient means integrally connecting the sections for tensioning the threads when both sections are threaded into an aperture, of an associated member, having a uniform continuous lead such that when in predetermined adjusted position in the member, the stud will remain in adjusted position even though the assembly as a whole is subjected to abnormal shocks and stresses during operational use.

An object of the invention is the provision of self-locking adjustment screws which are adapted to be associated with internally threaded members to establish a definite uniformly distributed locking relation therebetween and prevent unscrewing of one of the members with respect to the other under predetermined torque loads.

Another object of the invention is the provision of self-locking adjustment screws that are adapted for use as locking connections with valve tappets in order that when the screw or stud is positioned in the valve tappets it will maintain its predetermined adjusted position.

A further object of the invention is the provision of one piece self-locking screws having a pair of axially spaced lead mismatched threaded sections and having a resilient interconnecting section providing for a higher degree of elastic return.

A yet further object of the invention is the provision of a self-locking connection in the form of a self-locking screw or stud that under installed conditions within an associated threaded member provides adequate torque load resistance, providing for an effective normal locking engagement, low torsional deflections within its operating range and a minimum of bending in the resilient section of the screw.

A still further object of the invention is the provision of a self-locking screw comprising a pair of axially spaced equal pitch diameter threaded sections and a section integrally connecting the threaded sections having a plurality of diagonal slots and a control bore therein providing for high resiliency of the sections.

Other objects and advantages of the invention will appear from the following description taken

2 in connection with the drawings, forming a part of the specification; and in which:

Fig. 1 is a side elevational view of a self-locking screw.

Fig. 2 is a side elevational view of a locking screw of Fig. 1 with the operative parts thereof in section.

Fig. 3 is a side elevational view of a modified form of locking screw, and

Fig. 4 is a fragmentary partially sectionalized view of a locking screw of Figs. 1 and 2 in assembled relation with associated member.

The presently devised self-locking adjustment screws are of the general class of self-locking screws comprising a pair of axially spaced equal pitch diameter threaded sections, said sections being offset in lead axially to one another and having a resilient section therebetween providing the effective means for tensioning the screw in adjusted position when in threaded relation with a member with which it is adapted to be associated, the resilient section in the present screws being in the form of a plurality of angular crossed slots. It is optional to provide a central bore extending through a greater portion of the screws communicating with the angular slots to provide greater resiliency between the sections in the event it is required that greater axial deflections be permitted between the axial mismatched threaded section. By the provision of the slots in a symmetrical manner, uniform forces are obtained so that the plastic deformation and elastic deflections of the screws move the threaded sections apart axially. The axial movement between the threaded sections causes, in view of the angular arrangement of the slots, a slight angular movement between the sections. The degree of the helix angle of the slots is to be determined in accordance with the resiliency desired in the screw and the axially reduced section provided wherein the use of left hand helix slots on right hand threaded screws afford a greater resiliency as compared to right hand helix slots on right hand helix screws. The angular slots are employed in the instant structure primarily so as to afford a desired degree of resiliency, that is not otherwise obtainable by slots arranged perpendicularly to the axis of the screws within the length of reduced section provided.

Referring to Figs. 1 and 2 of the drawings for more specific details of the invention 10 represents generally a self-locking adjustment screw adapted primarily for use in cooperation with the valve tappet, comprising a head portion 12 which has its upper end formed to provide a bearing surface adapted to be engaged by appropriate mechanism such as an engine poppet valve, not shown, and a shank portion extending axially from and concentric to head portion 12.

The shank 14 of the screw includes a pair of axially spaced, axially aligned, equal pitch diameter threaded sections 16 and 18 integrally connected by a reduced unthreaded section 20 and concentrically arranged therewith. The lead of the thread on section 16 is axially offset relative to the lead of the thread on section 18 by negative amount and as such provides the locking means for the screw relative to the member with which it is to be associated. The dotted lines shown in Fig. 2 represent the path of a uniform continuous thread and as such illustrate the amount of negative mismatch in lead between the threaded sections 16 and 18.

As a means of affording axial deflection between sections 16 and 18 the reduced section 20 is provided with a plurality of angular or helix slots 22 symmetrically, circumferentially spaced about section 20 and extending an appreciable distance into the shank of screw 10. By the provision of slots 22 the reduced section 20 is made sufficiently resilient to permit of an elastic return between sections 16 and 18 when placed in operational assembly.

As a further and optional means of increasing the resiliency of section 20 the screw 10, as shown by Fig. 2, can be provided with a central bore 24 extending from the extremity of shank 14 through threaded section 18 and throughout the full length of reduced section 20 so as to communicate with the slots 22 extending through the reduced section 20 from the outer periphery thereof.

The resilient section 20 permits of a sufficient amount of axial deflection between axial lead mismatched sections 16 and 18 so as to provide a locking screw having ample torque holding qualities and satisfactory elastic return. Through the provision of slots 22 in a plurality, that is, three or more, symmetrically arranged about the circumference of section 20 the possibility of bending in section 20 is relieved thereby effecting axial holding deflections over a uniform bearing area of the threads when in association with a cooperative member such as shown in Fig. 4.

Fig. 4 illustrates the assembled relation of locking screw 10 in a member 26 such as a tappet body having a uniform continuous threaded bore 28 wherein the underside of the threads on section 16 bear uniformly axially upon the upperside of the threads 28 and the upperside of the threads on section 18 bear uniformly axially on the underside of threads 28 thereby effecting an efficient adjustable holding mechanism. With the locking screw 10 in adjusted position in member 26 the assembly is capable of withstanding normal operating conditions as predetermined without any change occurring in adjusted relation therebetween.

Fig. 3 illustrates a modification of screw 10 wherein a screw 100 is provided having a plurality of angular or helix slots 102, similar to slots 22 of screw 10, effective to provide resiliency between sections 104 and 106, extending outside of axial section 108 within which the slots are confined. The lead of the thread on respective sections 104 and 106 are axially offset relative to one another whereas the threads in sections 108 which are normal continuation of the threads in sections 104 and 106, are distorted or angularly offset with regards to sections 104 and 106. Through the provision of slots 102 sufficient resiliency is provided effective to afford a predetermined desired axial deflection between the sections 104 and 106. The screw 100 is adaptable for operational use as screw 10 in all respects but for the variation existing between the sections 20 and 108.

The screw 10 can be manufactured either by rolling the threaded sections 16 and 18 with thread roller dies having mismatched leads or by the machining or rolling of threads on sections 16 and 18 of a uniform continuation lead and then axially upsetting the section relative to one another to give the proper mismatch desired. The screw 100 can be manufactured by either machining or rolling threads throughout the length of the shank of the screw prior to slotting then slotting the screw sections 108 thereof and thence axially upsetting the section relative to one another to provide the proper mismatch therebetween similar to the operation that can be performed on screw 10.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. A self-locking screw comprising a shank including a pair of spaced mismatched equal pitch diameter threaded portions and a reduced portion integrally connecting the threaded portions having a plurality of angularly disposed slots extending substantially throughout the length thereof, said shank having a bore extending centrally therethrough from one extremity thereof into communication with the slots.

2. A self-locking screw comprising integral head and shank portions, the shank of which has a pair of axially spaced equal pitch diameter threaded sections, the lead of the thread on one section being offset axially to the lead of the thread on the other section, and a section integrally connecting the threaded sections of smaller diameter than the threaded sections having a plurality of like diagonal slots, said shank having a central bore extending from its free extremity oppositely disposed from the head end of the screw cooperating therewith providing for the resiliency thereof.

MICHAEL C. TURKISH.

REFERENCES CITED

The following references are of record in the file of this patent:

UNITED STATES PATENTS

| Number | Name | Date |
| --- | --- | --- |
| 380,184 | Celce | Mar. 27, 1888 |
| 2,035,055 | Dyer | Mar. 24, 1936 |
| 2,090,337 | Stoll | Aug. 17, 1937 |